United States Patent
Gulbransen et al.

(10) Patent No.: US 8,077,542 B2
(45) Date of Patent: Dec. 13, 2011

(54) DETERMINING THE INLINE RELATIONSHIP OF NETWORK NODES IN A SUBTERRANEAN SURVEY DATA ACQUISTION NETWORK

(75) Inventors: Espen Gulbransen, Oslo (NO); Vidar Anders Husom, Asker (NO)

(73) Assignee: Westerngeco L.L.C., Houston, TX (US)

( * ) Notice: Subject to any disclaimer, the term of this patent is extended or adjusted under 35 U.S.C. 154(b) by 400 days.

(21) Appl. No.: 12/349,578

(22) Filed: Jan. 7, 2009

(65) Prior Publication Data

US 2010/0172207 A1    Jul. 8, 2010

(51) Int. Cl.
G01V 1/38    (2006.01)
G01V 1/20    (2006.01)

(52) U.S. Cl. ............... 367/19; 367/14; 367/15; 367/76; 367/78; 367/154; 114/242; 114/244

(58) Field of Classification Search ............ 367/14, 367/15, 19, 20, 76, 78, 154; 340/853.1, 853.2, 340/870.01; 114/242, 244
See application file for complete search history.

(56) References Cited

U.S. PATENT DOCUMENTS

| | | | | |
|---|---|---|---|---|
| 4,635,235 A * | 1/1987 | Bearden | ............................. | 367/13 |
| 4,644,506 A * | 2/1987 | Cretin et al. | ...................... | 367/19 |
| 4,648,079 A * | 3/1987 | Stedtnitz | ............................. | 367/13 |
| 4,910,715 A * | 3/1990 | Savit | ............................... | 367/20 |
| 5,167,035 A | 11/1992 | Mann et al. | | |
| 5,303,202 A * | 4/1994 | Carroll et al. | ..................... | 367/13 |
| 5,883,856 A * | 3/1999 | Carroll et al. | ..................... | 367/13 |
| 6,024,344 A * | 2/2000 | Buckley et al. | ................... | 367/76 |
| 6,418,378 B1 | 7/2002 | Nyland | | |
| 6,556,510 B2 * | 4/2003 | Ambs | .............................. | 367/20 |
| 6,876,599 B1 * | 4/2005 | Combee | ........................... | 367/21 |
| 7,391,674 B2 | 6/2008 | Welker | | |
| 2003/0075380 A1 | 4/2003 | Orban et al. | | |
| 2004/0145968 A1 * | 7/2004 | Brittan et al. | .................... | 367/15 |
| 2006/0092042 A1 * | 5/2006 | Davis et al. | ............... | 340/870.01 |
| 2006/0239122 A1 * | 10/2006 | Vigen et al. | .................... | 367/131 |
| 2007/0225944 A1 * | 9/2007 | Knutsen | ......................... | 702/187 |
| 2007/0230268 A1 * | 10/2007 | Hoogeveen et al. | ............. | 367/19 |
| 2008/0019215 A1 * | 1/2008 | Robertsson et al. | ............. | 367/19 |
| 2008/0025146 A1 * | 1/2008 | Welker | .............................. | 367/20 |
| 2008/0056066 A1 * | 3/2008 | George et al. | .................... | 367/20 |
| 2010/0157728 A1 * | 6/2010 | Gulbransen | ...................... | 367/20 |

OTHER PUBLICATIONS

PCT Search Report, dated Aug. 5, 2010, Application No. PCT/US2009/068549.

* cited by examiner

Primary Examiner — Thomas Tarcza
Assistant Examiner — James Hulka
(74) Attorney, Agent, or Firm — Fred G. Pruner; Kevin B. McGoff; Kevin P. McEnaney

(57) ABSTRACT

A system includes a subterranean survey data acquisition network and a processor. The network has first nodes that are distributed along a length of the network between a first end of the network and a second end of the network. Each of the first nodes is capable of being either in a state in which the first node is transparent to the network or in a state in which the first node is visible to the network. The processor is adapted to communicate with the closest visible first node relative to the first end, and the processor is adapted to, based on the communication, determine whether the closest visible first node is the closest first node of all of the first nodes relative to the first end.

26 Claims, 6 Drawing Sheets

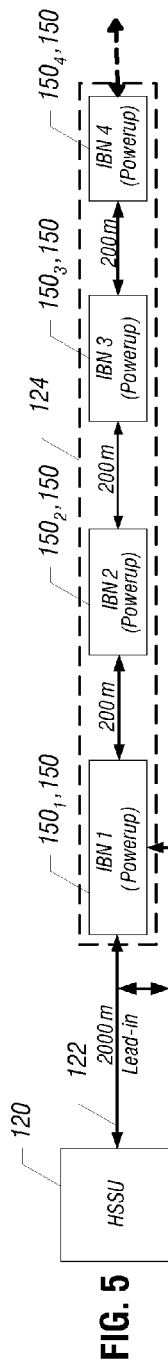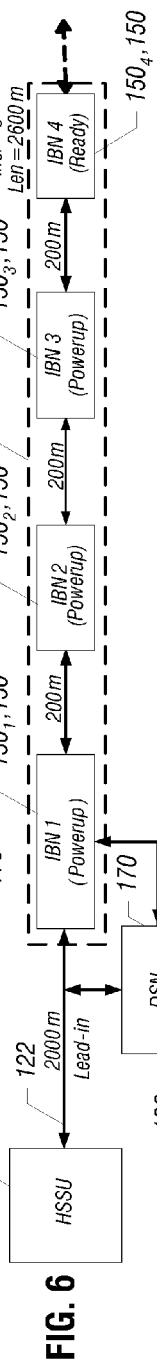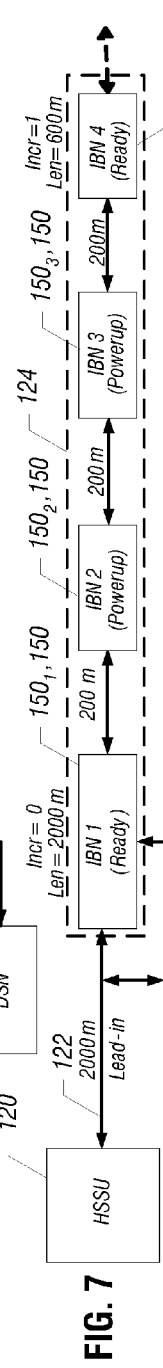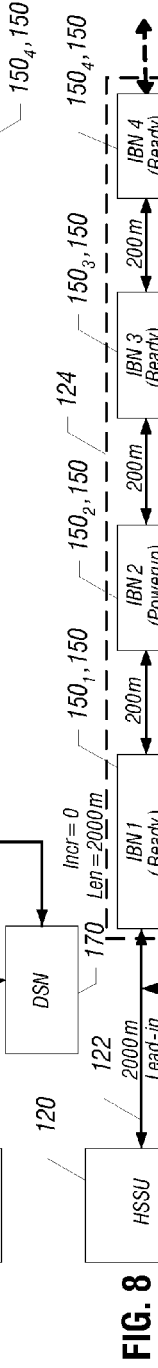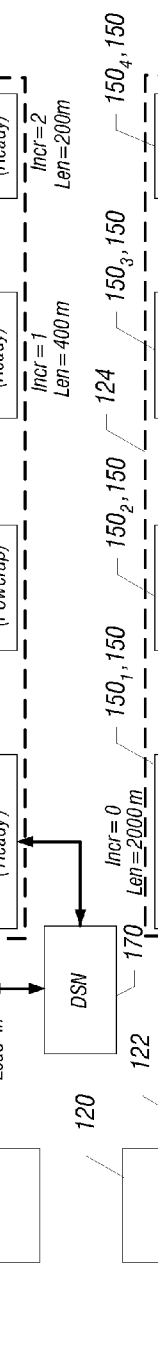
FIG. 5
FIG. 6
FIG. 7
FIG. 8
FIG. 9

DETERMINING THE INLINE RELATIONSHIP OF NETWORK NODES IN A SUBTERRANEAN SURVEY DATA ACQUISTION NETWORK

BACKGROUND

The invention generally relates to determining the inline relationship of network nodes in a subterranean survey data acquisition network.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique is usable with a subterranean survey data acquisition network that has first nodes that are distributed along a length of the network between a first end of the network and a second end of the network. Each of the first nodes is capable of being either in a state in which the first node is transparent to the network or in a state in which the first node is visible to the network. The technique includes communicating with the closest visible first node relative to the first end, and based on the communication, a determination is made whether the closest visible first node is the closest first node of all of the first nodes relative to the first end.

In another embodiment of the invention, a system includes a subterranean survey data acquisition network and a processor. The network has first nodes that are distributed along a length of the network between a first end of the network and a second end of the network. Each of the first nodes is capable of being either in a state in which the first node is transparent to the network or in a state in which the first node is visible to the network. The processor is adapted to communicate with the closest visible first node relative to the first end, and the processor is adapted to, based on the communication, determine whether the closest visible first node is the closest first node of all of the first nodes relative to the first end.

Advantages and other features of the invention will become apparent from the following drawing, description and claims.

BRIEF DESCRIPTION OF THE DRAWING

FIGS. 5, 6, 7, 8 and 9 are schematic diagrams illustrating a streamer network bootup sequence according to an embodiment of the invention.

DETAILED DESCRIPTION

Figure 1:
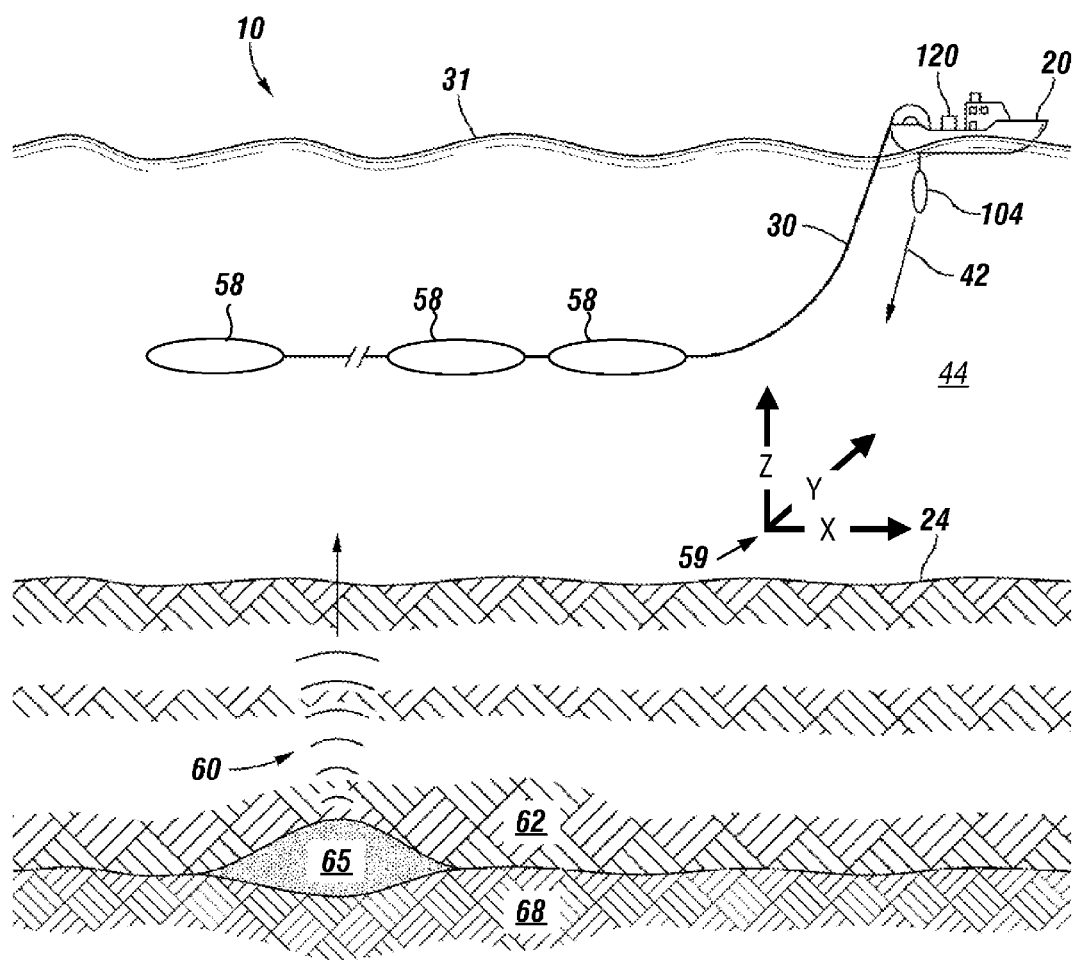
FIG. 1 is a schematic diagram of a marine seismic data acquisition system according to an embodiment of the invention.
Figure 2:
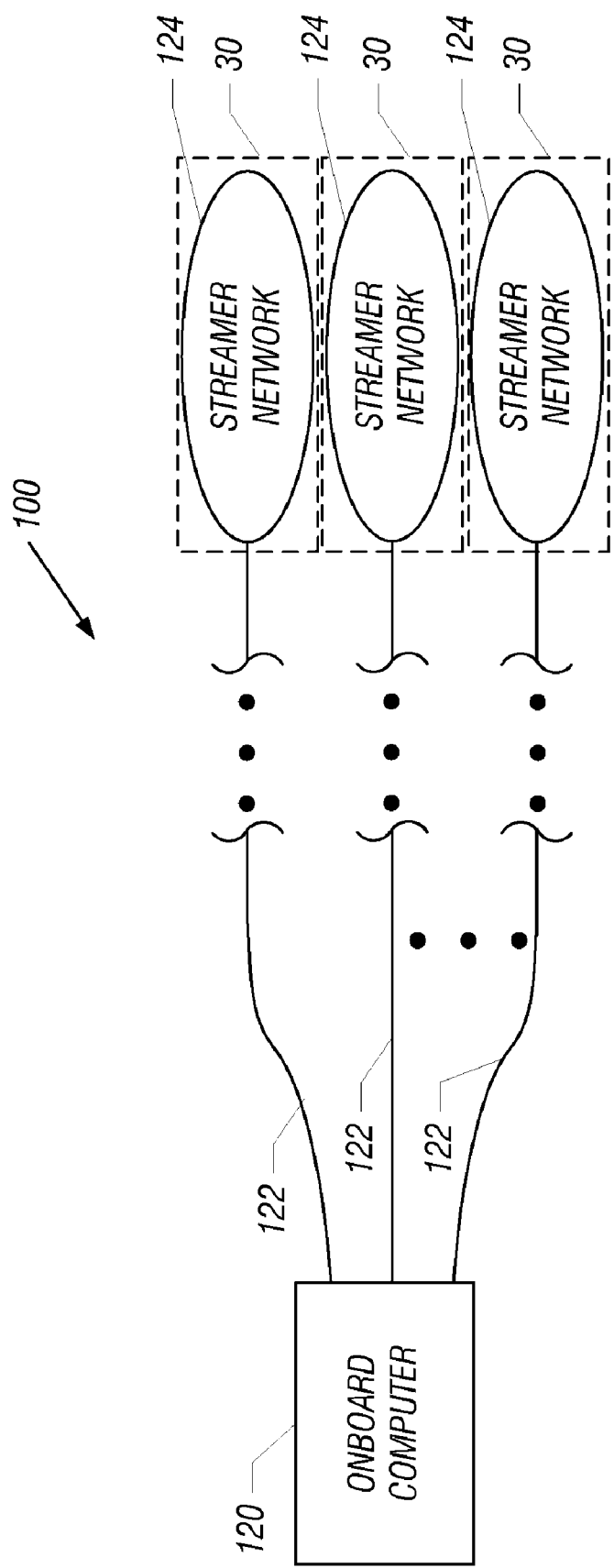
FIG. 2 is a schematic diagram of a communication system according to an embodiment of the invention.

FIG. 1 depicts an embodiment 10 of a marine seismic data acquisition system in accordance with some embodiments of the invention. In the system 10, a survey vessel 20 tows one or more seismic streamers 30 (one streamer 30 being depicted in FIG. 1) behind the vessel 20. The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors 58 that record seismic signals, and each streamer 30 is connected to the survey vessel through a lead-in cable 122, which is depicted in FIG. 2.

Still referring to FIG. 1, in accordance with some embodiments of the invention, the seismic sensors 58 may be pressure sensors, and in other embodiments of the invention, the seismic sensors 58 may be multi-component seismic sensors, each of which is capable of detecting a pressure wavefield and at least one component of a particle motion that is associated with acoustic signals that are proximate to the multi-component seismic sensor. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the seismic sensor 58 may include one or more hydrophones, geophones, particle displacement sensors, particle velocity sensors, accelerometers, pressure gradient sensors, or combinations thereof.

For example, in accordance with some embodiments of the invention, a seismic sensor 58 may include a hydrophone for measuring pressure and three orthogonally-aligned accelerometers to measure three corresponding orthogonal components of particle velocity and/or acceleration near the sensor 58. It is noted that a multi-component seismic sensor may be implemented as a single device (as depicted in FIG. 1) or may be implemented as a plurality of devices, depending on the particular embodiment of the invention. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, a particular point, seismic data indicative of the pressure data with respect to the inline direction.

The marine seismic data acquisition system 10 includes a seismic source 104 that may be formed from one or more seismic source elements, such as air guns, for example. As the seismic streamers 30 are towed behind the survey vessel 20, acoustic signals 42 (an exemplary acoustic signal 42 being depicted in FIG. 1), often referred to as "shots," are produced by the seismic source 104 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 produce corresponding reflected acoustic signals, or pressure waves 60, which are sensed by the seismic sensors 58. It is noted that the pressure waves that are received and sensed by the seismic sensors 58 include "up going" pressure waves that propagate to the sensors 58 without reflection, as well as "down going" pressure waves that are produced by reflections of the pressure waves 60 from an air-water boundary 31.

The seismic sensors 58 generate signals (digital signals, for example), called "traces," which indicate the acquired measurements of the pressure wavefield and particle motion. The traces are recorded and may be at least partially processed by a computer 120 (herein called the "onboard computer 120") that is deployed on the survey vessel 20, in accordance with some embodiments of the invention. For example, a particular multi-component seismic sensor may provide a trace, which corresponds to a measure of a pressure wavefield by its hydrophone; and the multicomponent sensor may provide one or more traces that correspond to one or more components of particle motion, which are measured by its accelerometers.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. In some embodiments of the invention, portions of the analysis of the representation may be performed on the seismic survey vessel 20, such as by the onboard computer 120. In accordance with other embodiments of the invention, the representation may be processed by a land-based seismic data processing system. In other embodiments of the invention, the representation may be at least partially processed by a processing system located on the streamers 30.

Referring to FIG. 2, in accordance with some embodiments of the invention, the system 10 may use a communication system 100 for purposes of communicating control and sensor data between the onboard computer 120 and the streamers 30. In particular, each streamer 30 contains a streamer network 124, which, in turn, includes master nodes that communicate with the onboard computer 120. In general, the master nodes are distributed along the length of the associated streamer 30 and may be relatively uniformly spaced apart.

For accurate processing of the acquired seismic data, the positions of the seismic sensors must be determined. Because the seismic sensors 58 have fixed relationships with respect to the master nodes and the positions of the master nodes are uniformly spaced apart, the distances between the seismic sensors 58 on each streamer 30 may be readily determined. However, the lengths of lead-in cables 122 that connect the streamers 30 to the survey vessel 20 are unknown and may significantly vary from one streamer spread configuration to the next. A technique is described herein, for purposes of using the master nodes and onboard computer 120 to determine the length of each of the lead-in cables 122.

It is noted that although FIG. 2 depicts streamer networks 124 of three streamers 30, the communication system 100 may be formed from more than or less than three streamer networks 124, depending on the number of streamers 30 in the streamer spread configuration.

Figure 3:
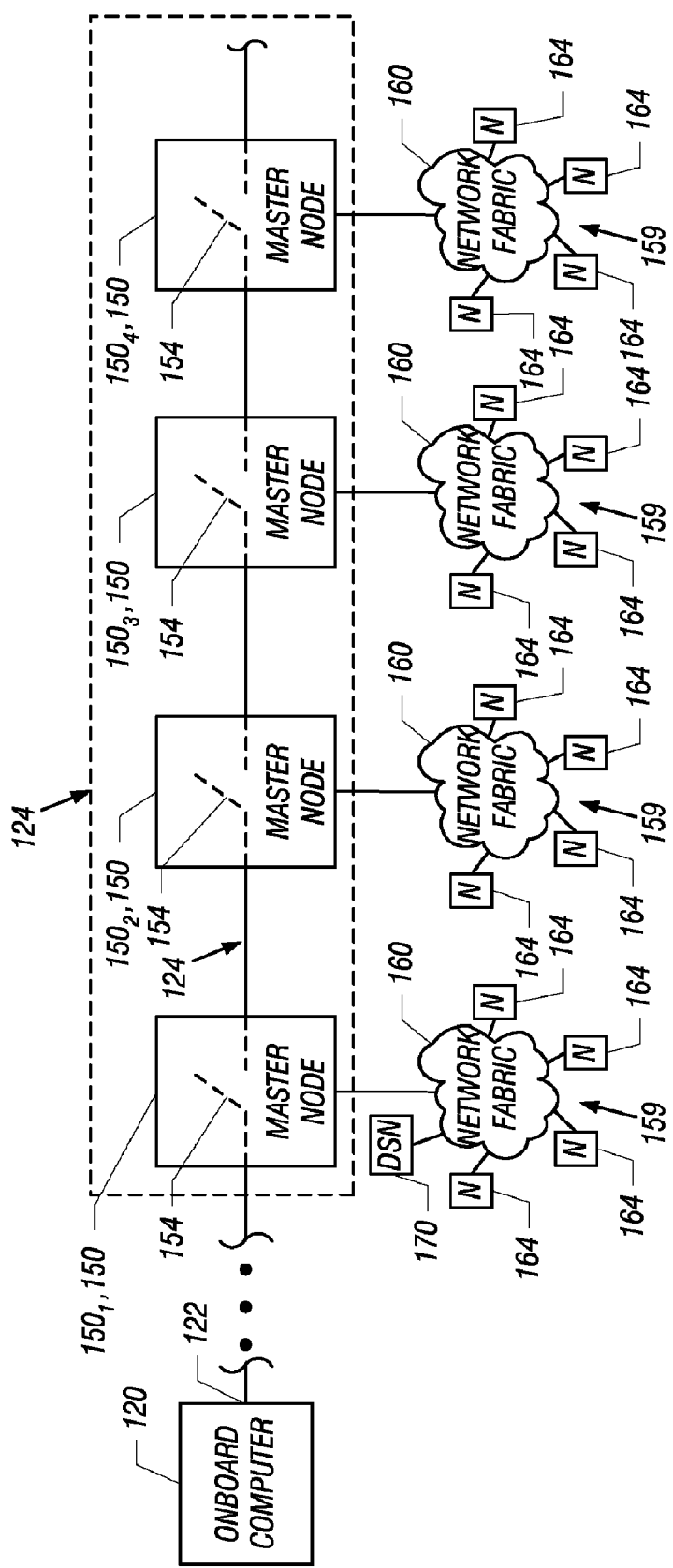
FIG. 3 is schematic diagram of a streamer network of FIG. 2 according to an embodiment of the invention.

FIG. 3 is a schematic diagram of the streamer network 124, in accordance with some embodiments of the invention. The streamer network 124 includes N master nodes 150 (four exemplary master nodes $150_1$, $150_2$, $150_3$ and $150_4$ being depicted in FIG. 3 as examples) that are distributed along the length of the streamer 30, where "N" is selected based on such factors as the streamer length and the seismic sensor spacing. In accordance with some embodiments of the invention, the master nodes 150 are uniformly spaced apart along the streamer 30. Therefore, as a more specific example, the distance between the master nodes $150_1$ and $150_2$ is the same as the distance between the master nodes $150_2$ and $150_3$.

The master nodes 150 are capable of determining the distances between adjacent master nodes 150 on the network 124, as well as determining a distance between the first master node $150_1$ (i.e., the node closest to the onboard computer 120) and the onboard computer 120, which is the length of the lead-in cable 122. However, the onboard computer 120, without the benefit of the network features described herein, does not know which master node 150 is the first master node $150_1$ due to nodes 150 being transparent when booting up.

More specifically, each master node 150 includes a bypass switch 154 that is closed to cause network communication to bypass the node 150 when the node 150 is not powered up. Therefore, when the bypass switch 154 of a particular master node 150 is closed, the node 150 is transparent to the network 124 (i.e., transparent to the onboard computer 120 and other master nodes 150). Before the power up of the first master node $150_1$, the bypass switch 154 of the node $150_1$ is closed to therefore render the node $150_1$ invisible, or transparent, to the onboard computer 120 and the other master nodes 150 of the network 124. Therefore, until the first master node $150_1$ powers up and opens its bypass switch 154, the master node $150_2$ or possibly another master node 150 may appear to be the first master node $150_1$.

For purposes of determining the length of the lead-in cable 122, the onboard computer 120 relies on a distance measurement that is performed by the first master node $150_1$. More specifically, each master node 150 is constructed, upon power up, to measure a distance between itself and another node of the streamer network 124. The distance measured by the first master node $150_1$ is the distance between the node $150_1$ and the onboard computer 120, or the lead-in distance. However, during the power up of the first master node $150_1$, the node $150_1$ may be transparent to the network 124 and thus, may be transparent to the onboard computer 120. Therefore, the onboard computer 120 may acquire incorrect measurement of the lead-in distance if the computer 120 merely relies on the distance measurement provided by the first visible master node 150.

In order that the onboard computer 120 may identify the first master node $150_1$, a special identifier is connected to the first master node $150_1$. Therefore, if the master node $150_1$ has not powered up and another master node 150 is the first visible master node 150, the onboard computer 120 recognizes that a distance provided by this other master node 150 is not the lead-in distance. As such, the onboard computer 120 may thereafter wait for the master node $150_1$ to power up and provide the lead-in distance or take other corrective action.

Turning to the other details of the streamer network 124, in accordance with some embodiments of the invention, the streamer network 124 may be an Ethernet network. As a more specific example, the Ethernet network may contain an optical fiber backbone that couples the master nodes 150 and onboard computer 120 together.

In accordance with some embodiments of the invention, each master node 150 controls its own associated network 159 of nodes on the streamer 30. It is noted that the nodes of the networks 159 may be uniformly spatially distributed along the streamer 30. As a more specific example, in accordance with some embodiments of the invention, each network 159 may include a network fabric 160 and nodes 164. The nodes 164 may be associated with seismic sensors (pressure and/or multicomponent seismic sensors, for example) as well as possibly various control devices of the streamer 30 such as depth control devices, birds, etc. In accordance with some embodiments of the invention, the network 159 associated with the first master node $150_1$ contains a special identifier node 170, which identifies the master node $150_1$ as being the first node on the streamer 30.

The master nodes 150 may be equivalent, in accordance with some embodiments of the invention, in that a streamer of an arbitrary length may be formed by connecting streamer sections of uniform lengths together, and each streamer section contains one of the master nodes 150 and its associated network 159. In order that the first master node $150_1$ is aware of its relationship to the vessel 20, the identifier node 170 is coupled to the network 159 that is associated with the node $150_1$. In accordance with some embodiments of the invention, each master node 150, upon power up, communicates with its associated network 159 for purposes of detecting whether the identifier node 170 is present and thus, determining whether the node 150 is the first master node $150_1$. Thereafter, the first master node $150_1$ identifies itself as the first node $150_1$ so that the onboard computer 120 may assume that the distance that is measured by the first master node $150_1$ is the lead-in distance.

In accordance with some embodiments of the invention, the relative positions of the master nodes 150 on the streamer network 124 are determined using a synchronization frame. More specifically, in accordance with some embodiments of the invention, the onboard computer 120 transmits a synchronization frame to the network 124, and the synchronization frame is thereafter communicated serially through the master nodes 150, with each node 150 stamping the frame to indicate the node's relative position on the streamer 30.

As an example, assume that the master nodes $150_2$ and $150_4$ have powered up when the synchronization frame is communicated across the network 124, and the master nodes $150_1$ and $150_3$ are still in their unpowered state and thus, are transparent to the network 124. For this example, the master node $150_2$ is the first master node 150 to receive the synchronization frame. The master node $150_2$ recognizes that it is the first node $150_2$ to receive the synchronization frame, as a counter field of the frame is in an initialized state, for example. Thus, the master node $150_2$ stores an indication in its memory, which indicates that the master node $150_2$ is the first visible master node 150 on the network 124. This stored indication configures the master node $150_2$ to respond to network communications that address the first visible master node 150.

The master node $150_2$ retransmits the synchronization frame to the next visible master node 150 of the network 124, which is the master node $150_4$ for this example. Upon receiving the synchronization frame, the master node $150_4$ reads the counter field of the frame, recognizes the counter field as zero, increments the value by one, and stores an indication that the master node $150_4$ is the second active frame on the network 124. Assuming that the streamer network 124 contains additional master nodes 150 downstream of the master node $150_4$, the master node $150_4$ retransmits the synchronization frame so that each visible master node 150 downstream of the master node 150 increments the synchronization frame's counter value by one and stores an indication of its position in its memory.

Thus, the communication of the synchronization frame through the network 124 allows the powered up and thus, visible master nodes 150 to determine their relative positions along the streamer 30. As set forth above, however, due to the transparency of the master nodes 150 that are not powered up, the indicated positions may not inaccurately identify which master node 150 is the actual first node on the streamer 30. For the example that is set forth above, the master node $150_2$ is the first visible node 150 identified on the network 124, due to the first master node $150_1$ not being completely powered up and therefore being transparent to the network 124.

In addition to determining their relative positions at power up of the network 124, the visible master nodes 150 (i.e., the powered up nodes 150) also determine the distances between the visible master nodes 150 and the distance between the first visible master node 150 and the onboard computer 120. More specifically, in accordance with some embodiments of the invention, in response to receiving the synchronization frame, a given master node 150 determines the distance between the entity that transmitted the synchronization frame and the node 150. For the example that is set forth above, the master node $150_2$ is the first visible node 150 of the network 124, which receives the synchronization frame from the onboard computer 120. In response to receiving the synchronization frame, the master node $150_2$ determines a distance between the master node $150_2$ and the onboard computer 120. Continuing this example, the master node $150_4$ is the next master node 150 to receive the synchronization frame. In response to receiving the synchronization frame, the master node $150_4$ determines the distance between the master node $150_4$ and the transmitting node, which is the master node $150_2$. This process continues for any additional visible master nodes 150. Thus, at the end of this process, each powered up (and visible) master node 150 stores a measured distance.

Many different techniques may be used for purposes of determining the distance between two nodes of the network 124, in accordance with the many possible embodiments of the invention. As a specific example, in some embodiments of the invention, the master nodes 150 may use a roundtrip delay measurement to determine the distance between nodes. For example, in response to receiving the synchronization frame, the master node $150_2$, the first visible node 150 for the above example, may communicate a special frame back to the onboard computer 120, which then transmits the frame back to the master node $150_2$. Based on the time for the roundtrip travel of the special frame, the master node $150_2$ determines the distance between the master node $150_2$ and the onboard computer 120. Distances between adjacent visible master nodes 150 may be determined in a similar manner.

Figure 4:
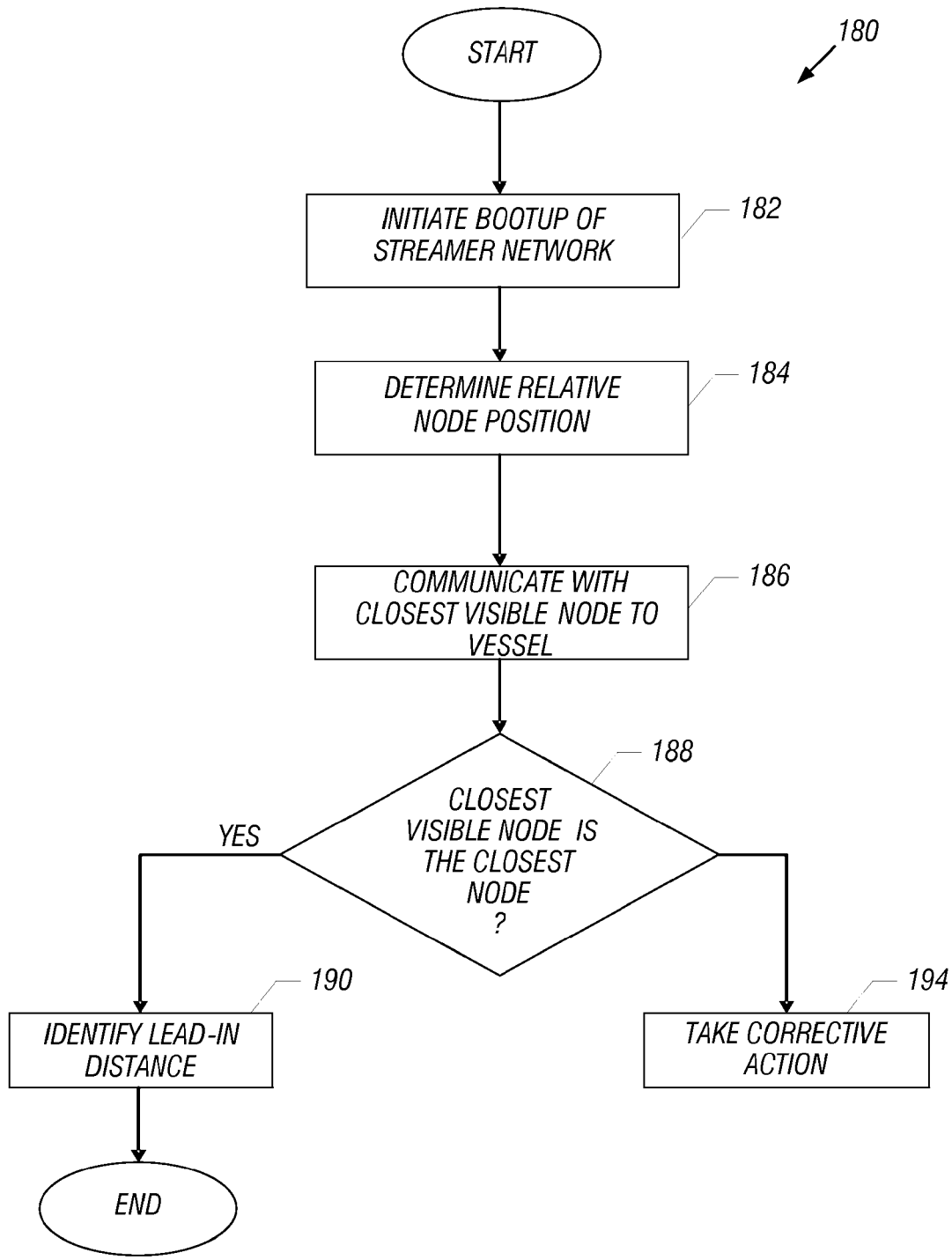
FIGS. 4 and 10 are flow diagrams depicting techniques to determine a length of a streamer lead-in cable according to embodiments of the invention.

Referring to FIG. 4 in conjunction with FIG. 3, in accordance with embodiments of the invention, in general, a technique 180 may be used for purposes of determining the length of the lead-in cable 122. Pursuant to the technique 180, bootup of the streamer network 124 is initiated, pursuant to block 182. In this regard, in accordance with some embodiments of the invention, power may be supplied to the streamer cable 30 from the vessel 20 for purposes of causing the various master nodes 150 of the streamer 30 to power up.

Next, the technique 180 includes determining relative node positions, pursuant to block 184. For example, the onboard computer 120 may launch a synchronization frame that is used by the master nodes 150 to determine their relative positions, as described above. The technique 180 includes communicating (block 186) with the closest visible node to the survey vessel 20 for purposes of determining whether the node is, in fact, the closest node to the vessel 20. For example, if the master node $150_2$ is the first visible node on the network 124, then communication with the master node $150_2$ reveals that the master node $150_2$ is not the first node, as the master node $150_2$ has not detected the presence of the identifier node 170. If, however, the master node $150_1$ is powered up and is the first visible node, then communication with the master node $150_1$ reveals that the master node $150_1$ is the closest node, as the master node $150_1$ has detected the identifier node 170.

Continuing with the technique 180, upon determining (diamond 188) that the closest visible master node 150 is the first master node 150, the technique 180 includes identifying (block 190) the lead-in distance. In other words, if the closest visible master node 150 is the first master node $150_1$, then the onboard computer 120 knows that the distance measured by the master node $150_1$ (between the node $150_1$ and the onboard computer 120) is the lead-in distance.

Otherwise, if the first visible master node 150 is not the closest node, further corrective action is taken, pursuant to block 194. More specifically, in accordance with some embodiments of the invention, the onboard computer 120 may launch another synchronization frame for purposes of causing the master nodes 150 to redetermine the relative node positions and to measure the distances between the nodes of the network 124. Thus, the corrective action may involve a return to block 184. If a sufficient time has been allotted for the power up of the entire network 124, the corrective action may involve determining that the first master node $150_1$ has failed and thus, may involve replacing the master node $150_1$. Other variations are contemplated and are within the scope of the appended claims.

It is noted that the techniques described herein permit the master nodes 150 to power up in an arbitrary sequence, as the use of the identifier node 170 allows a positive identification of the first master node $150_1$, and thus, positively identifies the lead-in distance.

As a more specific example, FIGS. 5, 6, 7, 8 and 9 depict a bootup sequence of the streamer network 124 in accordance with some embodiments of the invention. For this example, the master nodes 150 (exemplary master nodes $150_1$, $150_2$, $150_3$ and $150_4$ being depicted in FIG. 5) are uniformly spaced apart by 200 meters (m), and the identifier node 170 is coupled to the first master node $150_1$. Furthermore, for this example, the onboard computer 120 is spaced apart from the first master node $150_1$ by a distance of 2,000 m (i.e., the lead-in distance). As shown in FIG. 5, initially, all of the master nodes 150 are powering up, but none of the nodes 150 have completed the power up phase; and as such, all of the master nodes 150 are transparent and thus, cannot be detected on the network 124.

For the state of the streamer network 124, which is depicted in FIG. 6, the master node $150_4$ is the first visible master node 150 on the network 124 (i.e., the first master node 150 to power up). The onboard computer 120 communicates a synchronization frame to the network 124, which is received by the node $150_4$. In response to receiving the synchronization frame, the master node $150_4$ determines that the node $150_4$ is the first visible master node 150, and the master node $150_4$ measures a distance of 2600 m between the master node $150_4$ and the onboard computer 120. It is noted that by communicating with the master node $150_4$ (i.e., the first visible master node 150), the onboard computer 120 determines that the master node $150_4$ is not the first master node $150_1$ of the network 124.

FIG. 7 depicts a subsequent time during the bootup sequence in which the first master node $150_1$ and the master node $150_4$ are powered up and thus, are visible to the network 124. However, for this example, the master nodes $150_2$ and $150_3$ have not completed powering up and as such, are transparent to the streamer network 124. Therefore, for the state of the network depicted in FIG. 7, the master nodes $150_1$ and $150_4$ are effectively the first and second master nodes 150, respectively, on the network 124.

Furthermore, as depicted in FIG. 7, the master node $150_1$ measures a distance of 2000 m between itself and the onboard computer 120, and the master node $150_4$ measures a distance of 600 m between itself and the master node $150_1$. It is noted that at this point, the distance measured by the master node $150_1$ between the node $150_1$ and the onboard computer 120 is the lead-in distance. Thus, communication between the onboard computer 120 and the master node $150_1$ reveals that the master node $150_1$ is, in fact, the first master node and reveals the lead-in distance.

It is noted that the master node $150_4$ is not the second master node 150 on the streamer 30. However, the onboard computer 120 recognizes the true position of the master node $150_4$, due to the master node $150_4$ being located three distance units (i.e., three 200 m units) away from the master nodes $150_1$. Thus, the onboard computer 120 may infer that the master nodes $150_2$ and $150_3$ have not completed powering up.

For the state of the bootup sequence that is depicted in FIG. 8, the master nodes $150_1$, $150_3$ and $150_4$ are powered up and are visible to the streamer network 124. As shown, the master node $150_3$ indicates that it is the second node and has measured a distance of 400 m between itself and the first master node $150_1$. Furthermore, for this state, the master node $150_4$ has determined that it is the third node 150 of the streamer 30 and has measured a distance of 200 m between itself and the master node $150_3$.

FIG. 9 depicts a state of the boot sequence in which all four exemplary master nodes $150_1$, $150_2$, $150_3$ and $150_4$ have powered up and thus, are visible to the streamer network 124. As shown, each of the master nodes 150 indicates the correct distance between itself and the adjacent master node 150.

Figure 10:
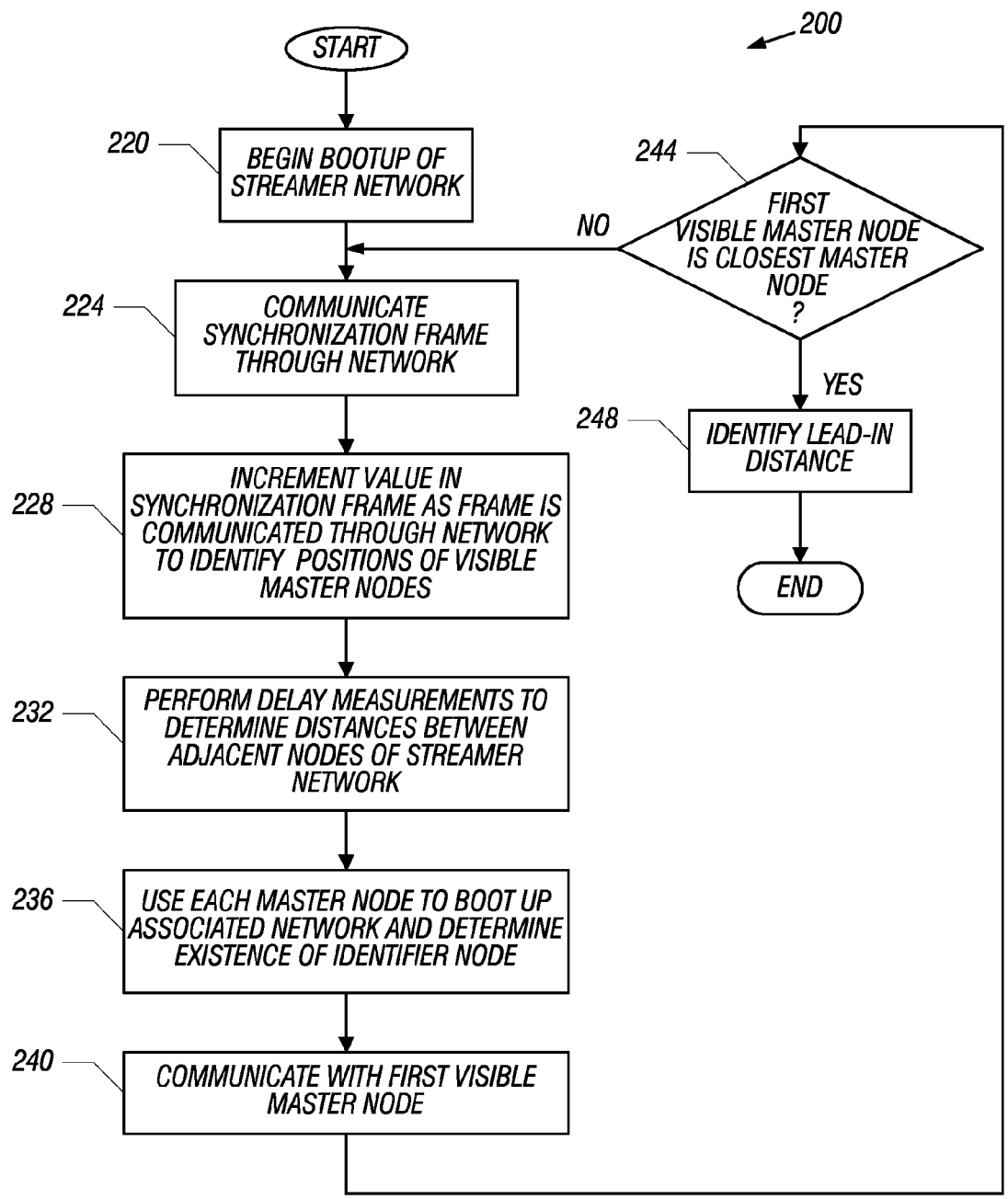

To summarize, FIG. 10 depicts an exemplary technique 200 that may be used in accordance with embodiments of the invention. Referring to FIG. 10 in conjunction with FIG. 3, the technique 200 includes beginning (block 22) the bootup of the streamer network 124. Next, a synchronization frame is communicated through the network 124, pursuant to block 224. A value in the synchronization frame is incremented (pursuant to block 228), as the frame that is communicated through the network for purposes of identifying the node positions. Furthermore, delay measurements are performed (block 232) to determine the distances between adjacent nodes of the network 124, including the distance between the first active master node 150 and the onboard computer 120.

Next, according to the technique 200, each master node 150 that is powered up boots up its associated network 159 and determines whether the identifier node is part of this network, pursuant to block 236. The onboard computer 120 then communicates with the first visible master node, pursuant to block 240. If a determination is made (diamond 244) that the first visible master node is the first master node, then the lead-in distance has been identified, pursuant to block 248. Otherwise, control returns to block 224 in which another synchronization frame is communicated through the network and another set of distances and node positions are determined, as set forth above.

Other embodiments of the invention are within the scope of the appended claims. As an example, the streamer may be a "miniature streamer" that is towed behind a seismic source array. As another example, the systems and techniques that are described herein may likewise be applied to a seismic data acquisition system other than a towed system (a seabed cable-based seismic data acquisition system, for example).

Furthermore, the systems and techniques that are disclosed herein may be applied to subterranean survey data acquisition systems other than seismic-based systems. For example, in accordance with other embodiments of the invention, the systems and techniques that are disclosed herein may be used in a controlled source electromagnetic (CSEM) survey system (as a non-limiting example) that uses electromagnetic sources and sensors rather than seismic sources and sensors. The CSEM system may be a towed or a seabed cable-based system.

As yet another variation, in accordance with some embodiments of the invention, the disclosed network and associated systems may be may be used on a source-disposed network. For example, the network may be distributed along the length of a seismic source.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method usable with a subterranean survey data acquisition network having first nodes distributed along a length of the network between a first end of the network and a second end of the network, and each of the first nodes capable of being either in a state in which the first node is transparent to the network or in a state in which the first node is visible to the network, the method comprising:
   communicating with the closest visible first node relative to the first end, the communication comprising information indicative of a relationship of the closest visible first node relative to at least one of the other first nodes; and
   based on the communication, determining whether the closest visible first node is the closest first node of all of the first nodes relative to the first end.

2. The method of claim 1, wherein the network is disposed on a seismic streamer towed by a vessel, and the first end comprises an end of the streamer closest to the vessel.

3. The method of claim 2, wherein the seismic streamer is attached to a source towed by the vessel.

4. The method of claim 1, wherein the network is disposed on a seabed sensor cable.

5. The method of claim 4, wherein the seabed sensor cable comprises electromagnetic sensors or seismic sensors.

6. The method of claim 1, wherein the network is disposed on a seismic source.

7. The method of claim 1, further comprising:
   based on the determination, determining whether a distance measured by the network represents a length of a lead-in to a streamer.

8. The method of claim 1, further comprising:
   repeating the act of communicating in response to determining that the closest visible first node is not the closest first node of all of the first nodes to the first end.

9. The method of claim 1, further comprising:
   coupling an identifier to the closest first node; and
   in response to powering up, each first node determining whether the first node is the closest first node by determining whether the identifier is coupled to the first node.

10. The method of claim 9, wherein the act of determining whether the first node is the closest first node comprises each first node identifying nodes coupled to a network managed by said each node.

11. The method of claim 1, further comprising:
    performing a test on the network to determine relative positions of the first nodes, comprising communicating a synchronization frame among the first nodes; and
    for each of the first nodes that is not transparent, changing a value of the frame to identify the relative position of the node.

12. The method of claim 11, wherein the act of changing the value comprises incrementing a counter value of the frame.

13. The method of claim 1, further comprising:
    performing delay measurements to determine relative positions of the first nodes.

14. The method of claim 1, wherein the communicating comprises transmitting the information from the first visible closest node.

15. A system comprising:
    a subterranean survey data acquisition network having first nodes distributed along a length of the network between a first end of the network and a second end of the network, each of the first nodes capable of being either in a state in which the first node is transparent to the network or in a state in which the first node is visible to the network; and
    a processor adapted to:
       communicate with the closest visible first node relative to the first end, the communication comprising information indicative of a relationship of the closest visible first node relative to at least one of the other first nodes; and
       based on the communication, determine whether the closest visible first node is the closest first node of all of the first nodes relative to the first end.

16. The system of claim 15, wherein the subterranean survey data acquisition network comprises a seismic data acquisition network towed by a vessel.

17. The system of claim 16, wherein the processor is located on board the vessel.

18. The system of claim 16, wherein the seismic data acquisition network is located on a source or on a streamer.

19. The system of claim 15, wherein the subterranean survey data acquisition network comprises electromagnetic or seismic sensors.

20. The system of claim 15, wherein the subterranean survey data acquisition network comprises a seabed cable.

21. The system of claim 15, further comprising:
    a streamer on which the first nodes are disposed, the streamer being towed by a vessel and the first end being located closer to the vessel than the second end; and
    a lead in to connect the vessel to the streamer, wherein the processor is adapted to:
       based on the determination, determine whether a distance measured by the network is indicative of the length of the lead-in.

22. The system of claim 21, further comprising:
    an identifier coupled to the closest first node of all of the first nodes to the vessel, wherein each first node, in response to powering up, determines whether the first node is the closest first node of all of the first nodes by determining whether the identifier is coupled to the first node.

23. The system of claim 22, further comprising:
additional networks, each of the additional networks being managed by one of the first nodes,
wherein the identifier is connected to the additional network managed by the first node that is the closest first node of all of the first nodes to the vessel.

24. The system of claim 23, wherein the additional networks comprise seismic sensors.

25. The system of claim 15, wherein
the first nodes are adapted to communicating a synchronization frame among the first nodes; and
for each of the first nodes that is visible, the first node is adapted to change a value of the frame to identify the relative position of the first node.

26. The system of claim 15, wherein the processor is further adapted to communicate with the first visible closest node to retrieve the information from the first visible closest node.

* * * * *